(12) United States Patent
Scommegna et al.

(10) Patent No.: US 11,369,457 B2
(45) Date of Patent: Jun. 28, 2022

(54) TOOL FOR HANDLING PALATAL EXPANDERS

(71) Applicant: LEONE S.P.A., Sesto Fiorentino (IT)

(72) Inventors: Gabriele Scommegna, Tavarnuzze Impruneta (IT); Maurizio Dolfi, Florence (IT)

(73) Assignee: LEONE S.P.A., Sesto Fiorentino (IT)

( * ) Notice: Subject to any disclaimer, the term of this patent is extended or adjusted under 35 U.S.C. 154(b) by 32 days.

(21) Appl. No.: 15/750,266

(22) PCT Filed: Oct. 24, 2016

(86) PCT No.: PCT/IT2016/000250
§ 371 (c)(1),
(2) Date: Feb. 5, 2018

(87) PCT Pub. No.: WO2017/072804
PCT Pub. Date: May 4, 2017

(65) Prior Publication Data
US 2018/0228575 A1    Aug. 16, 2018

(30) Foreign Application Priority Data

Oct. 29, 2015 (IT) .......................... UB2015A004848

(51) Int. Cl.
*A61C 7/04*     (2006.01)
*A61C 7/10*     (2006.01)
*A61C 3/00*     (2006.01)

(52) U.S. Cl.
CPC .................. *A61C 7/04* (2013.01); *A61C 3/00* (2013.01); *A61C 7/10* (2013.01)

(58) Field of Classification Search
CPC .... A61C 7/02; A61C 7/04; A61C 7/10; A61C 3/00; A61C 3/14; A61C 3/16; A61C 13/12; B25B 9/02; A61B 17/30

(Continued)

(56) References Cited

U.S. PATENT DOCUMENTS 1,108,299 A * 8/1914 Wisman .................... B25B 9/02
                                                        294/99.2
2,042,985 A * 6/1936 Gardella ................ A61B 17/30
                                                        606/210

(Continued)

FOREIGN PATENT DOCUMENTS

DE        28 08 149 A1     5/1979
JP         2015-136567 A   7/2015

OTHER PUBLICATIONS

PCT Written Opinion of the International Searching Authority dated Mar. 14, 2017 of corresponding International application No. PCT/IT2016/000250; 6 pgs.

(Continued)

*Primary Examiner* — Heidi M Eide
*Assistant Examiner* — Drew S Folgmann
(74) *Attorney, Agent, or Firm* — Maier & Maier, PLLC (57) ABSTRACT

Tool for handling palatal expanders, including two opposed jaws adapted to clamp at least one body of a palatal expander, a handle, and actuation means adapted to move said jaws between a clamping position on said at least one body and respectively a release position, said jaws being bound elastically to one another and are normally spaced from each other, and said actuation means comprising a slider slidably mounted on the outer surfaces of the jaws, the slider being provided with a part adapted to interact with said outer surfaces so as to compress the jaws by pushing them toward each other when it is made to slide along a first direction and free them when it is made to slide along a second direction, said actuation means being adapted to firmly but reversibly lock the jaws in said clamping position.

4 Claims, 8 Drawing Sheets

(58) Field of Classification Search
USPC .............................................................. 433/4
See application file for complete search history.

(56) References Cited

U.S. PATENT DOCUMENTS

| | | | | | |
|---|---|---|---|---|---|
| 2,381,084 | A | * | 8/1945 | Slad .................. | A45D 26/0071 606/133 |
| 3,279,286 | A | * | 10/1966 | Larson ................ | B25B 23/1427 81/477 |
| 4,841,819 | A | * | 6/1989 | Williams .................. | B25B 9/02 29/278 |
| 5,224,403 | A | * | 7/1993 | Rueb .................. | B25B 23/1427 81/477 |
| 7,303,220 | B2 | * | 12/2007 | Zellak ................. | G02B 6/3807 29/762 |
| 8,105,229 | B2 | * | 1/2012 | Muller ................. | H04R 25/606 600/25 |

OTHER PUBLICATIONS

International Search Report dated Mar. 14, 2017 of corresponding International application No. PCT/IT2016/000250 3 pgs.

\* cited by examiner

TOOL FOR HANDLING PALATAL EXPANDERS

FIELD

The present invention relates to a tool for handling palatal expanders, in particular for retaining a palatal expander in the modeling phase of its arms.

BACKGROUND

It is known that a palatal expander is an intraoral device used to correct the transverse growth deficiency of the maxilla by the application of suitable forces to increase the transverse size of the dental arch. In general, an orthodontic expander consists of two bodies intended to be connected at predetermined teeth of the right side and the left side of the dental arch by means of several anchoring arms. Said bodies are connected to each other by a central screw. The thrust exerted by the screw on the two bodies is transmitted, by means of said arms, to the two sides of the dental arch, thus obtaining the desired expansion in a relatively short time during which a periodic re-loading actuated through the central screw is required. The anchoring aims must be suitably shaped to copy the transverse profile of the palatal vault and to maintain the bodies of the expander, and the arms, sufficiently spaced from the palate tissues and to avoid that these parts of the expander are positioned too close to the tongue. For this purpose, said anchoring arms, which in the process of industrial production of the expander are rectilinear, are manually modeled by a skilled technician that at this stage makes use of a dental arch model and a clamp. The latter serves to hold the bodies of the expander with one hand, while with the other hand the technician provides for the bending of the anchoring arms according to the shape of the palate reproduced by the model. The clamps are commonly used to retain the bodies of the palatal expander while performing the bending of the anchoring arms are of the type comprising two jaws formed at the corresponding ends of two levers hinged to each other. The use of these clamps, however, involves several drawbacks, among which: the loss of position of the expander bodies if the pressure exerted on the levers is insufficient or if the technician, having to interrupt the work, releases the levers; the possibility to produce engravings on the expander bodies if the pressure exerted on the jaws is excessive or the jaws are badly positioned with respect to the expander bodies; the substantial impossibility of firmly holding one body only to access the central screw when the expander is tested.

DE2808149 discloses a dental ligature setting instrument used in dentistry having two jaws adapted to grip a ligature.

SUMMARY

The main purpose of the present invention is to overcome the aforementioned drawbacks and to propose an alternative tool.

This result is achieved, according to the present invention, by adopting the idea of making a tool having the features indicated in claim 1. Other features of the present invention are the object of the dependent claims.

Since a tool in accordance with the present invention incorporates a mechanism providing a stable locking of the expander, the user can also terminate its work without loss of the expander structure configuration, such that the modeling of the expander arms can also be performed in several not necessarily consecutive phases. In addition, the jaws may be shaped so as to visually indicate the minimum distance to be maintained between the bodies of the expander and the palate vault. Moreover the present tool is particularly simple from a constructive and functional point of view.

BRIEF DESCRIPTION OF THE FIGURES

These and other advantages and characteristics will be best understood by anyone skilled in the art thanks to the following description and to the attached drawings, provided by way of example but not to be considered in a limiting sense, wherein.

DETAILED DESCRIPTION

Reduced to its basic structure and with reference to the attached drawings, a tool in accordance with the present invention comprises a distal part with two jaws (1) adapted to be tightened on the bodies (C) of a palatal expander (E).

According to the example shown in the drawings, the palatal expander (E) is of the type comprising two bodies (C), joined by a central screw (V), from which bilaterally protrude four rectilinear anchoring arms (B) intended to be modeled individually according to the oral cavity conformation of the patient reproduced, for example, by a plaster model (M). The bodies (C) are slidably mounted on two rectilinear guides (G) positioned on opposite sides with respect to the screw (V) and parallel to the latter. The arms (B) are provided with annular distal bands (A) to allow their anchorage to the teeth selected (D).

Figure 3:
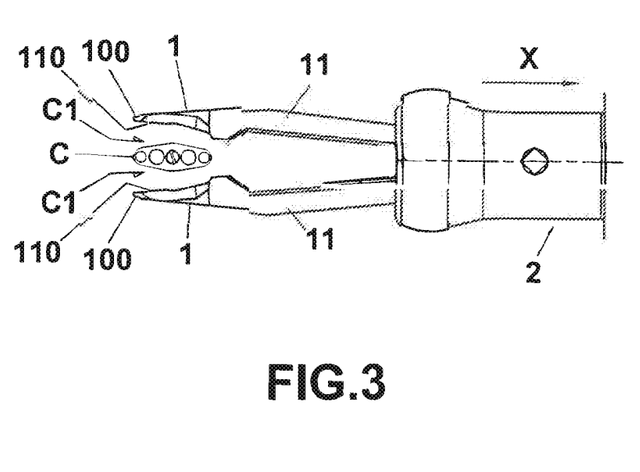
FIG. 3 is a view similar to that of FIG. 2 but with the jaws of the tool in the open position.
Figure 4:
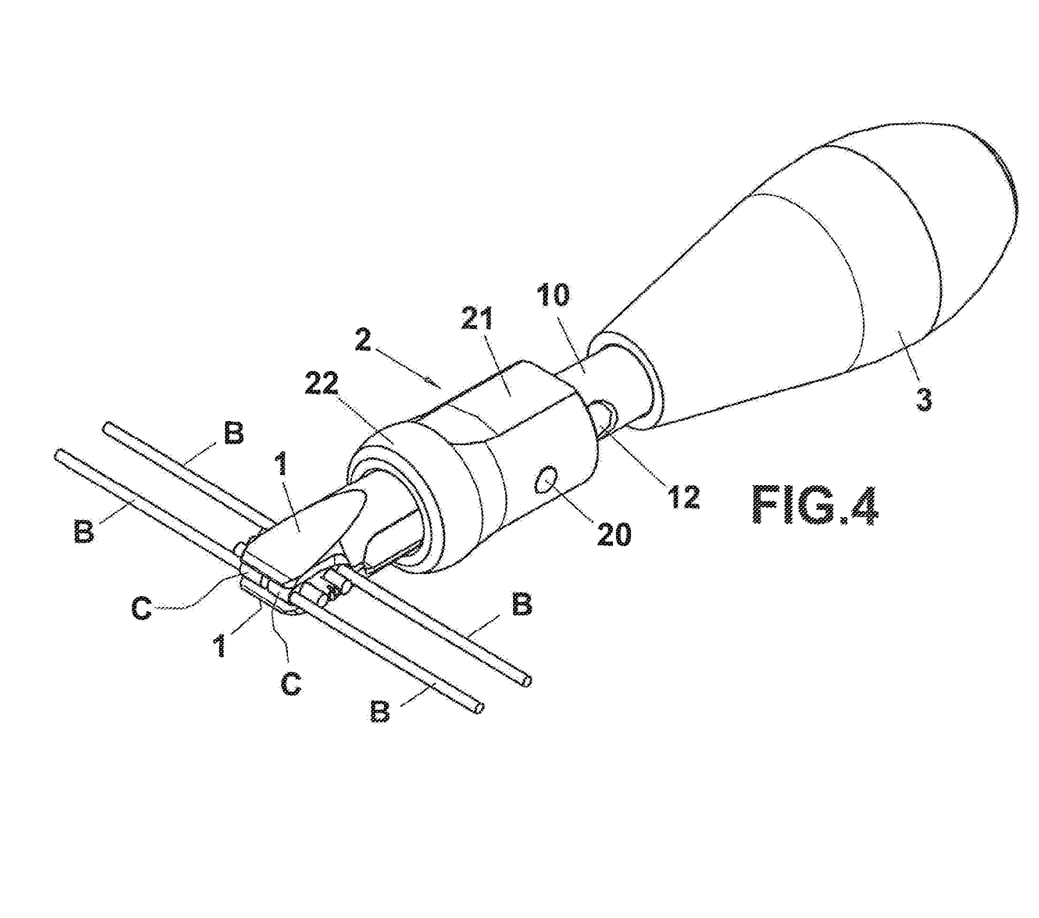
FIG. 4 is a further views of the tool shown in FIG. 1.
Figure 5:
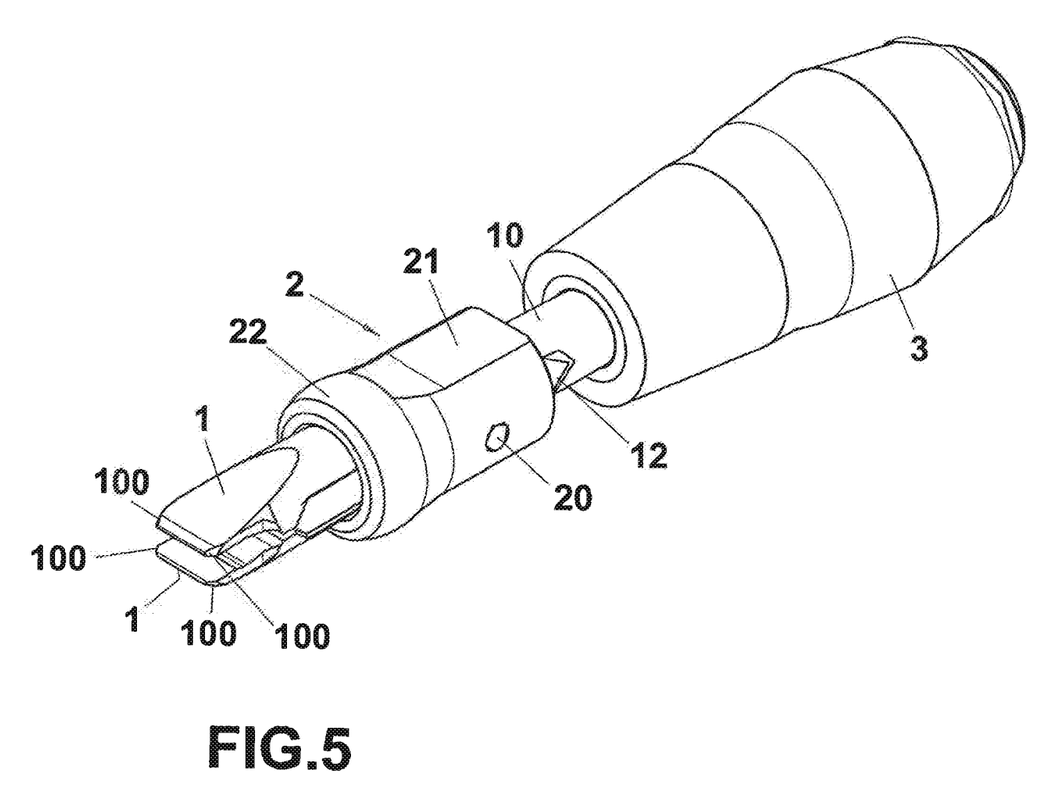
FIG. 5 is a further view of the tool shown in FIG. 1.

A tool in accordance with the invention comprises a slider (2) adapted to slide longitudinally on the jaws (1). In FIGS. 1, 2, 4 and 6 the slider (2) is in the advanced position. In FIG. 3 the slider (2) is in the retracted position. When the cursor (2) is in the advanced position, the jaws (1) are closed. Conversely, by sliding the cursor (2) backward as indicated by the arrow 'X', the jaws (1) are opened. In practice, by advancing the slider (2) as indicated by arrow 'Y', the latter interacts with the jaws (1) approaching them to each other and thus arranging them in the clamping position.

Figure 9:
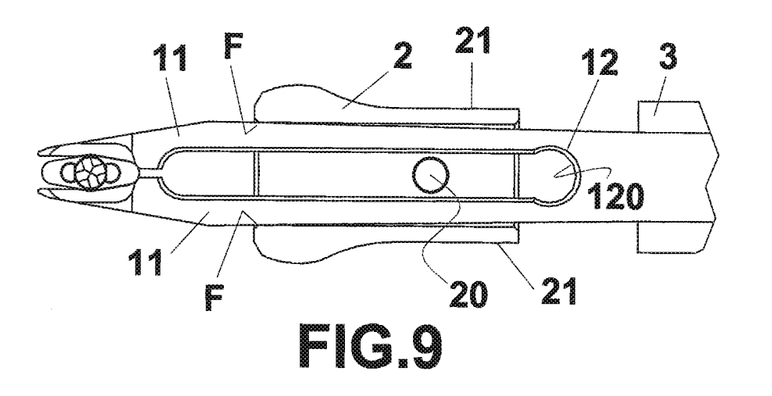
FIG. 9 is a schematic longitudinal section view of the tool positioned as in FIG. 1.
Figure 10:
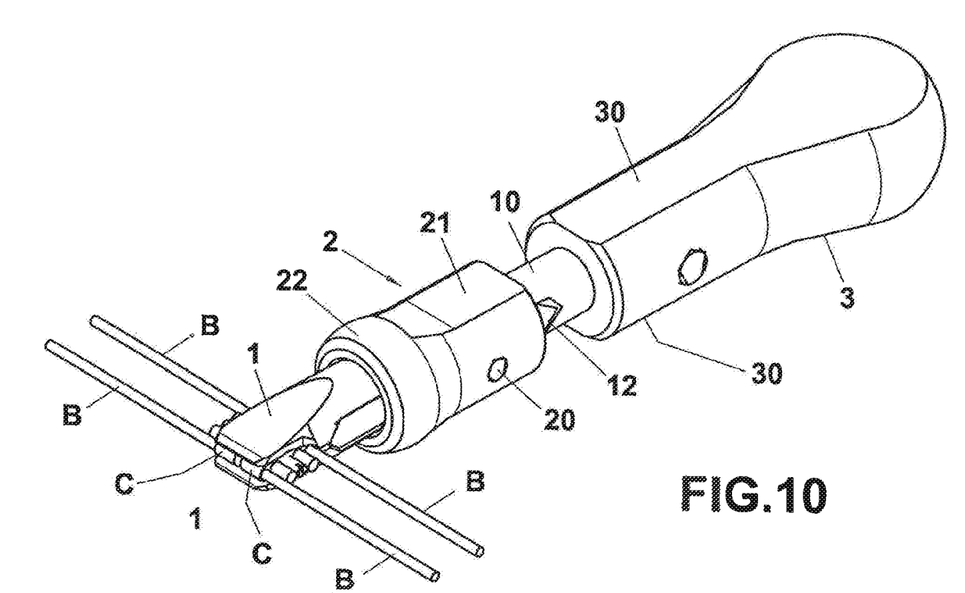
FIG. 10 is similar to FIG. 4 but showing a further embodiment of the tool according to the present invention.

According to the example shown in the drawings, the jaws (1) are formed at the free ends of the two opposite appendixes (11) of a substantially cylindrical body (10) which, at the point from which protrude the appendices, has a smaller resistant section to favor the elastic flexing of said appendixes. The appendixes (11) constitute, in practice, two opposed arms joined to the body (10) where the resistant section of the latter is reduced. For example, at the point from which the appendixes (11) protrude, the body (10) has a recess (12). In the example, the recess (12), seen laterally, has the shape of an arc of a circle whose angular amplitude is greater than 180°. On the side opposite to the appendixes (11), on the body (10) there is applied a handle (3). Furthermore, in accordance with the example shown in the drawings, the cursor (2) is provided with a transverse pin (20) adapted to slide between the appendixes (11). The backward stroke (X) of the slider (2), i.e. the movement of the slider (2) towards the handle (3), is limited by the front surface (120) of the recess (12) with which, at the end of the backward movement, the pin (20) comes into contact. The forward movement (Y) of the slider (2) is mechanically limited by the interference between the inner surface of the slider (2) and the outer surface of the appendixes (11) upstream of the jaws (1) as indicated by reference "F" in FIG. 9. In practice the appendixes (11) have a frusto-conical shape, whereby when the slider (2) is fully advanced there is the above-mentioned interference (F). The frusto-conical shape of the appendixes (11) in the clamped position is particularly shown in FIG. 9 where a clearance is visible between the slider (2) and the appendixes (11) on the side opposite to the side where said interference (F) tales place.

The slider (2) is internally hollow to be able to slide on the appendixes (11) of the body (10).

The outer surface of the slider (2) can be suitably shaped to facilitate its handling by using the thumb of the hand holding the tool. For this purpose, the slider (2) may have two opposite flattened external surfaces (21) that are connected to a circular front edge (22) of increased diameter.

In the advanced position, the slider (2) locks the jaws (1) in the clamping position, so that the user is not obliged to exert a continuous pressure for retaining the palatal expander (E) in the desired position and can also temporarily put the tool, for example on a table of the laboratory, without the risk that the clamping position is lost. Therefore, the tool is self-locking, since the release of the expander (E) is determined solely by returning the cursor back to the position of non-interference with the jaws.

The slider (2) constitutes a member for firmly locking the jaws (1) in the clamping position.

Preferably, the ends of the jaws (1) have a front part with corner chamfers (100) that facilitate the bending of the arms (B) in the vicinity of the expander body (C), such that the bend point is particularly close to the same body (C).

The foregoing description exemplifies the embodiment of a tool in accordance with the present invention that, in more general terms, is a tool comprising two opposed jaws (1) arranged to tighten at least one body (C) of a palatal expander (E) and driving means adapted to arrange the jaws (1) in a reversible clamping position on said at least one body (C), said jaws (1) being elastically bound to one another and being normally spaced from each other, said driving means comprising a slider (2) slidably mounted on the outer surfaces of the jaws (1), the slider (2) being provided with a part adapted to interact with said outer surfaces so as to compress the jaws (1) by pushing them towards each other when it is moved in a first direction and release them when it is moved in a second direction. According to the example described above, the part of the slider (2) that interacts with the outer surface of the jaws (1) is the surface which delimits the internal cavity of the slider. Furthermore, according to the example described above, the elastic connection between the two jaws is achieved by providing the recess (12) in the body (10) of the tool. This constraint is such that the jaws (1) are normally spaced apart, such that the clamping position is determined by moving the slider (2) forwards, that is, by moving the slider towards the free ends of the jaws, and the restoration of the normally spaced-apart position of the jaws is determined by moving the slider backwards.

Advantageously, each jaw (1) has an inner side (110) that copies a corresponding outer side (C1) of the expander body.

Advantageously, to allow a grip even more effective, the handle (3) has two flat surfaces (30) aligned with the flat internal parts (21) of the slider (2).

Figure 1:
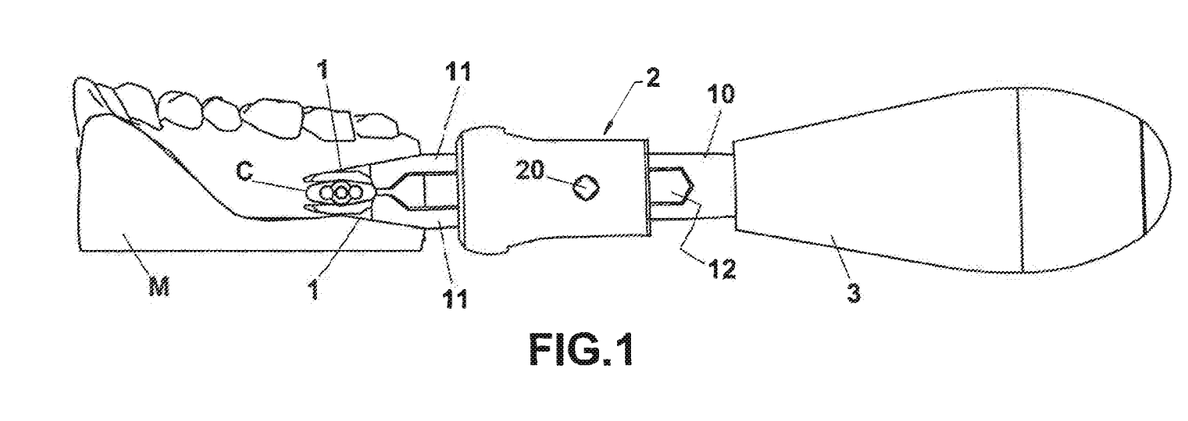
FIG. 1 is a schematic side view of a tool in accordance with the present invention, with the jaws clamped on the body of a palatal expander and in the approach phase of the expander to a model of a dental arch.
Figure 2:
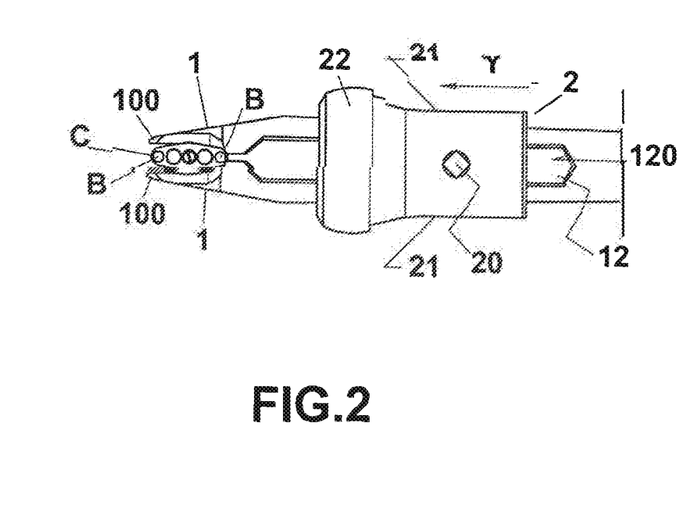
FIG. 2 is an enlarged detail of FIG. 1.
Figure 6:
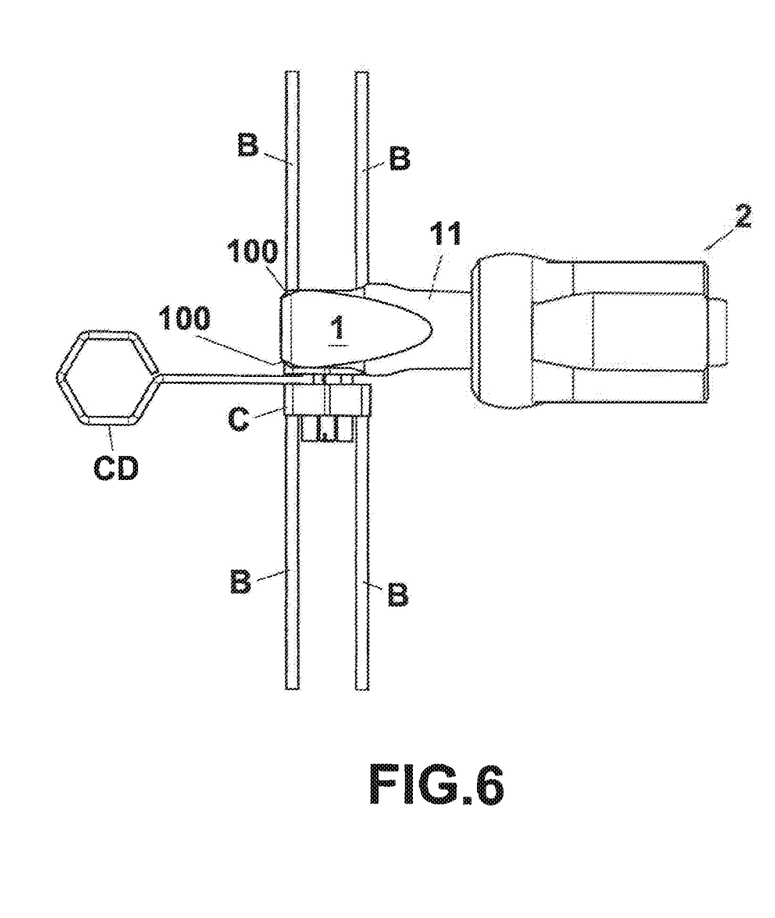
FIG. 6 is a top view of the tool jaws clamped on one body only of the palatal expander.
Figure 7:
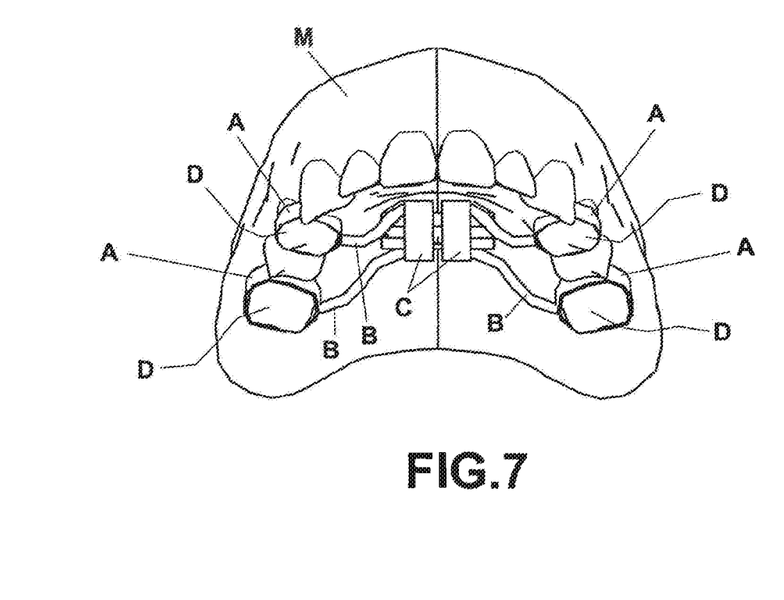
FIG. 7 is a schematic perspective view of the expander mounted on the dental arch model.
Figure 8:
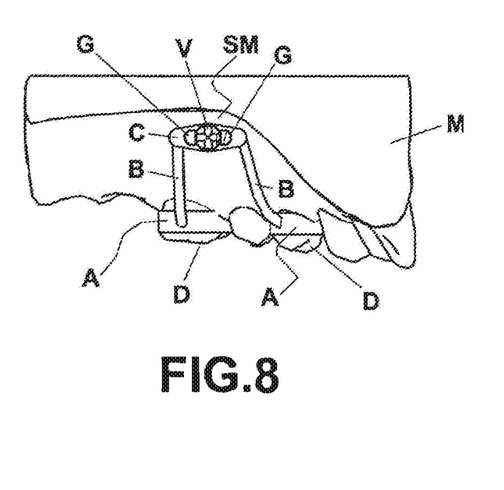
FIG. 8 is a schematic side view of the expander mounted on the dental arch model.

The tool described above allows a correct holding of the palatal expander (E) while the arms of the latter are subjected to modeling. The jaws (1) may be shaped according to the shape and the size of the palatal expanders normally available on the market. The closed or clamping position of jaws (1) is obtained through a locking mechanism comprising the slider described above which is activated and deactivated with the simple action of the thumb. The thickness of the jaws (1) is preferably such as to indicate the minimum space (MS) to be maintained between the bodies (C) of the expander and the palate vault: by positioning a jaw (1) on the palate of the model reproduction (M), for example as shown in FIG. 1, the correct inclination and the correct height of the bending to be given to the arms (B) will be immediately apparent. The tool described above can advantageously be used also for retaining only one body (C) of the expander, for example, as shown in FIG. 6, to test the screw (V) by means of a stick (CD) commonly used to drive this kind of screw.

In practice the details of execution may vary in any equivalent way for what concerns the individual elements described and illustrated, without thereby departing from the scope of the adopted solution and thus remaining within the limits of the protection conferred by the present patent.

The invention claimed is:

1. Tool for handling palatal expanders comprising:
two opposed jaws adapted to clamp at least one body of a palatal expander and actuation means adapted to move said jaws between a clamping position on said at least one body and respectively a release position, said jaws being spaced from each other when not subjected to external force, said actuation means comprising a slider slidably mounted on the outer surface of the jaws, the slider being provided with a part adapted to interact with said outer surface so as to compress the jaws by pushing the jaws towards each other when the slider is made to slide along a first direction and free the jaws when the slider is made to slide along a second direction, said actuation means being adapted to firmly but reversibly lock the jaws in said clamping position, wherein:
each of said jaws is formed by an end part of one of two appendices provided by a tool body having a recess between the two appendices, said two appendices protruding from the tool body, said recess being located on an opposite side in relation to the end parts of said two appendices, said two appendices being elastically connected with each other where the two appendices protrude from said tool body, such that said jaws at the end parts of said two appendices are bound elastically to one another accordingly, said recess starts from the connection of said two appendices, and said two appendices having mutually opposite inner sides,
the tool comprises guide means adapted to guide the slider along said first and second directions, said guide means comprise a pin adapted to slide between the mutually opposite inner sides of said appendices, and the recess has a front surface that faces the direction of the movement of the slider and limits the movement of the slider along the second direction through the contact between the pin and the front surface of the recess, a handle is mounted opposite to the two appendices in relation to the recess; and the movement of the slider along the second direction ends by the contact of the pin with the front surface of the recess;

wherein the slider is internally hollow to be able to slide on the two appendices of the body and the slider has two opposite flattened external surfaces that are connected to a circular front edge of increased diameter; and the two appendices have a frusto-conical shape to provide interference with the slider when the slider is fully advanced along said first direction.

2. Tool according to claim 1, wherein the front surface of said recess has the profile of a circular arc of angular amplitude greater than 180°.

3. Tool according to claim 1 wherein each jaw has an inner side that copies a corresponding outer side of said body of the palatal expander.

4. Tool according to claim 1 wherein the handle has two flat gripping surfaces aligned with corresponding flat surfaces of the slider.

* * * * *